INVENTOR
GEORGE J. CRITS

ATTORNEYS

Sept. 29, 1970  G. J. CRITS  3,531,401
METHOD OF REGENERATING ION EXCHANGERS
Filed Jan. 23, 1968  3 Sheets-Sheet 3

INVENTOR
GEORGE J. CRITS
BY
ATTORNEYS

United States Patent Office 3,531,401
Patented Sept. 29, 1970

---

3,531,401
METHOD OF REGENERATING ION EXCHANGERS
George J. Crits, Havertown, Pa., assignor to Crane Co., Chicago, Ill., a corporation of Illinois
Filed Jan. 23, 1968, Ser. No. 699,940
Int. Cl. B01d 15/06
U.S. Cl. 210—34                    4 Claims

ABSTRACT OF THE DISCLOSURE

Following a conventional regenerating step of an ion exchanger, a regenerating electrolyte is recirculated through an ion exchange bed in the direction of service flow to displace potential leakage ions from the effluent region of the bed to the influent region.

BACKGROUND OF THE INVENTION

In the regeneration of fixed beds in ion exchangers, regardless of whether the regenerant is applied concurrent or countercurrent to the intended exhausting liquid stream, a small residual amount of unregenerated ions is left at the effluent end of the bed. These residual ions subsequently leak off during the main service cycle by a mass action effect or by the driving effect of the exchanged ions. This driving effect is related to the total dissolved solids of the influent; the higher the total dissolved solids in the influent, the higher will be the leakage.

There are four main types of leakage experienced in fixed ion exchange beds:

(a) Substantially uniform leakage
(b) Non-uniform leakage involving decreasing leakage at the beginning of service flow
(c) Non-uniform leakage involving increasing leakage from the beginning of the service flow
(d) Combinations of the foregoing types of leakage Most ion exchange operations involve leakages of the types (a), (b) and (d). In these cases, the leakage is mainly due to unregenerated ions a the effluent end of the bed or to ionic contamination left inadvertently for other reasons.

Leakage of the type (c) is generally due to shallow ion exchange beds or where the ion exchange equilibrium is quite unfavorable.

For illustration of the problem involved, consideration may be given to a fixed bed ion exchanger through which downward flow is involved in service and in which regeneration is effected by downward flow of regenerant. In the interest of economy, a minimum quantity of regenerant is usually used, and this is inadequate to effect complete regeneration, some leakage being tolerated. The leakage just referred to would occur even with the best distribution of the regenerant. But complete regenerant distribution is an ideal not always obtained and consequently inferior distribution results in additional unregenerated ions at the bottom of the bed. Poor regenerant collection distributor design or inadequate flow rate of the regenerant further contribute to the increase of unregenerated ions at the bottom of the bed.

As another example of conventional operations giving rise to leakage, there may be cited a system in which, while the service flow is downward through the bed, regeneration is effected by upward flow of the regenerant through the bed, such a system being referred to as a countercurrent system. In this case unregenerated pockets of resin are also obtained, though to a lesser degree than in the preceding example, depending on the effectiveness of the regenerant distributor. However, the displacing rinse water that follows the regenerant imparts additional contaminating ions to the bottom of the bed which then leak off into the service stream.

In both the foregoing and other systems, the unregenerated ions subsequently leak off during the service flow by mass action effect or the driving effect of the exchanged ions, and in many instances is approximately directly proportional to the total dissolved solids of the influent to be treated.

SUMMARY OF THE INVENTION

In accordance with the invention, a conventional regeneration is followed by a recycling flow of the same regenerant in a more dilute state or of a different regenerant flowing through the bed in the direction of service flow with return to the influent end of the bed. The operation will be discussed in greater detail hereafter, but what it amounts to is, in effect, to displace from the effluent end of the bed the ions which would contribute to leakage, returning them to the influent end of the bed, to the extent that further regeneration does not occur. By reason of this transfer, the objectionable ions during service flow will have a higher probability of being absorbed as they pass in the direction of service flow through the bed and leakage is greatly reduced. As will appear, the invention is applicable to various different systems, the principle being essentially the same in all cases.

The general objects of the invention relate to the attainment of the results just briefly indicated, and more detailed objects will become apparent from the following description.

DESCRIPTION OF THE PREFERRED EMBODIMENTS

References will be made first to the physical aspects of systems embodying the invention, with later references to chemical matters.

Figure 1:
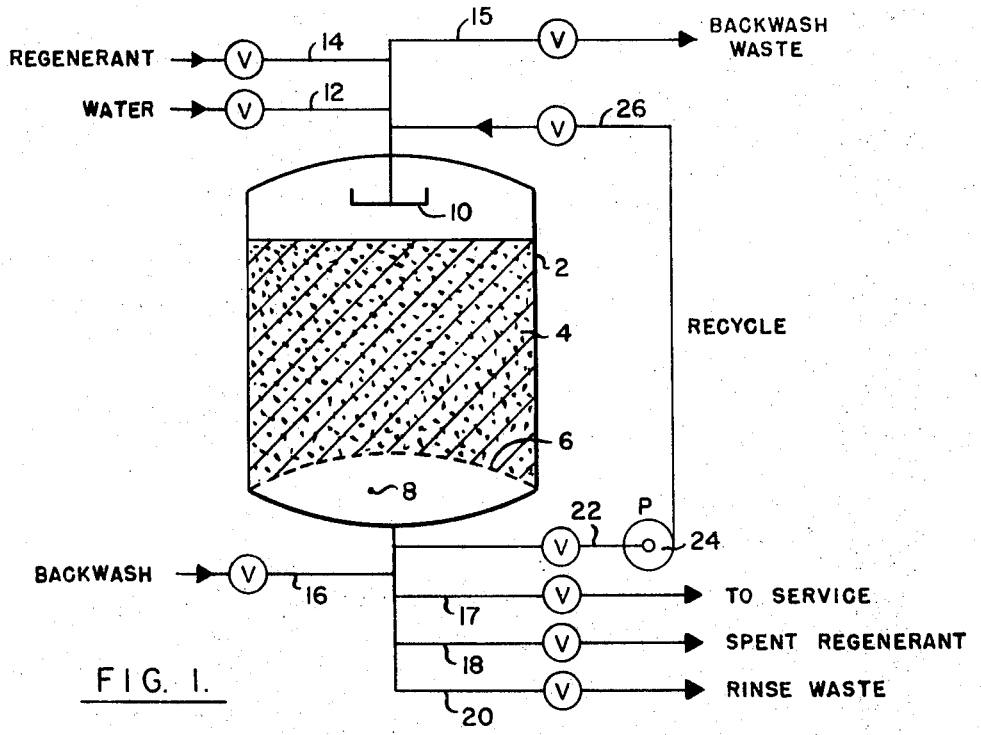
FIG. 1 is a flow diagram of a system embodying downward flow of regenerant and downward service flow through an ion exchange bed.

FIG. 1 is a flow diagram showing a system in which service flow is downwardly through a bed and regeneration is effected by downward flow through the bed. It will be understood that multiple ion exchange units are frequently arranged in batteries so that while one is undergoing regeneration others remain in service; but since the operations of significance affect the individual units only one is illustrated. For purposes of description, separate lines and valves are shown, but with the understanding that in an actual system various conventional rearrangements of these may be involved.

The vessel 2 contains the ion exchange resin bed 4 supported on a conventional perforated (screen or the like) base 6, below which is provided a distributing chamber 8. Within the top of the vessel 2 is a conventional distributor 10 arranged to distribute influent substantially evenly over the top of the bed.

Connected to the distributor 10 are various valved lines, including a water influent line 12 to supply the service water to be treated and also rinse water, a regenerant line 14, and a backwash waste line 15.

Connected to the chamber 6 there is the backwash water inflow line 16, the outflow service line 17, the spent regenerant line 18, and the rinse waste line 20.

The recycling connections involve the line 22 running from chamber 8 to a pump 24 from which delivery is through the connection 26 to the distributor 10 at the top of the vessel.

For the foregoing cycle, the regeneration procedure involves the following steps after interruption of the service run:

Conventional backwash is first effected to remove extraneous dirt and to regrade the bed by the production of a flow of backwash water through connection 16 upwardly through the bed at a rapid rate to expand and agitate the resin particles, with passage of the backwash to waste through connection 50.

Upon completion of the backwash the bed is allowed to settle.

Next, regenerant is introduced at 14 to flow downwardly through the bed with exit at 18. Depending upon the ion exchange actions involved, the spent regenerant may either run to waste or may be collected for some further operation. For example, if the eluted ion is of value and should be recovered (e.g., chromium or zinc) the spent regenerant goes on for suitable further processing. In other cases some initial regenerant may be discarded while later portions of the regenerant may be saved to act as initial regenerant flow in a subsequent operation.

At this stage the regenerant will ordinarily be of a composition conventionally suitable in the particular case involved with normal flow rates and quantity suited to optimum results taking matters of economy into consideration, the latter usually dictating attainment of somewhat less than complete regeneration. The foregoing steps are conventional.

It is at this point that the matter of the invention enters into the procedure.

The vessel 2 will now contain the regenerant, and in many instances it will be desirable to displace part of the regenerant from the vessel to produce in the vessel a more dilute regenerant. For this purpose after closing the regenerant line 14 a measured quantity of water is introduced through the line 12 partially displacing the remaining regenerant which may pass out through the line 18. When the desired displacement is effected, both lines 12 and 18 are closed.

The recycling in accordance with the invention now takes place by opening the connections 22 and 26 and operating the pump 24 to produce a recirculation of the liquid downwardly through the bed 4. During this recirculation the concentration will become substantially uniform. The time of the recirculation, depending upon the results desired, may range greatly in time (for example from ten minutes to many hours), depending on the ion exchange application involved with flow rates also varying greatly, for example from 6 to 50 gallons per minute per square foot of cross-sectional area. For most applications, recycling for about 30 minutes is adequate to effect substantial reduction of leakage. Flow rates are ordinarily around 10 to 20 gallons per minute per square foot of cross-sectional area. Increase of temperature of the recycling regenerant stream may be desirable for still further improvement of leakage, heat being applied to the line 22, 26. More specific considerations in connection with the recycling will be discussed hereafter in connection with particular processes.

Following the recycling, the final operation is essentially that conventionally used following ordinary regeneration:

Rinsing is effected by the introduction of water at 12 with exit to waste through connection 20, the rinsing being carried out until the concentration of regenerant is reduced to the desired point. The service operation is then renewed, with the water to be treated entering at 12 and passing to the point of service through connection 17.

It was indicated above that for production of a suitable regenerant for the recycling operation there would usually be a mere dilution of the original regenerant. However, in some cases, the recycled regenerant may desirably differ from the main regenerant, in which case the original regenerant may be rinsed out of the vessel and there may then be introduced thereto a composition which added to water remaining in the vessel after partial replacement of the water will provide the composition suitable for recycling. After sulfuric acid is used for the main regeneration, it may be desirable to introduce for recycling another acid such as hydrochloric acid, nitric acid or phosphoric acid particularly in instances in which while sulfuric acid because of cheapness may be desirably used for the main regeneration, a more expensive acid may be desirably used for more effective completion of regeneration and the more effective transfer of potential leakage ions from the bottom of the bed to the top thereof by the recycling operation. Similarly, for example, if sodium hydroxide regeneration of strongly anion exchangers is used, the sodium hydroxide may be rinsed out and a different regenerant may be introduced for recycling such as potassium hydroxide, calcium hydroxide, lithium hydroxide, or ammonium hydroxide.

Another obvious variant which may be involved would be that connected with upflow of the liquid through the bed in the service cycle. Such flow may be provided in some instances utilizing containing vessels of conventional types for this purpose, i.e. suitable for prevention of resin loss and the maintenance of beds in proper condition for optimum ion exchange. In such case, however, the recycling to be effected must be upwardly through the bed in order to effect the transfer of potential leakage ions from the effluent end (the upper end) of the bed to the influent end thereof.

Figure 2:
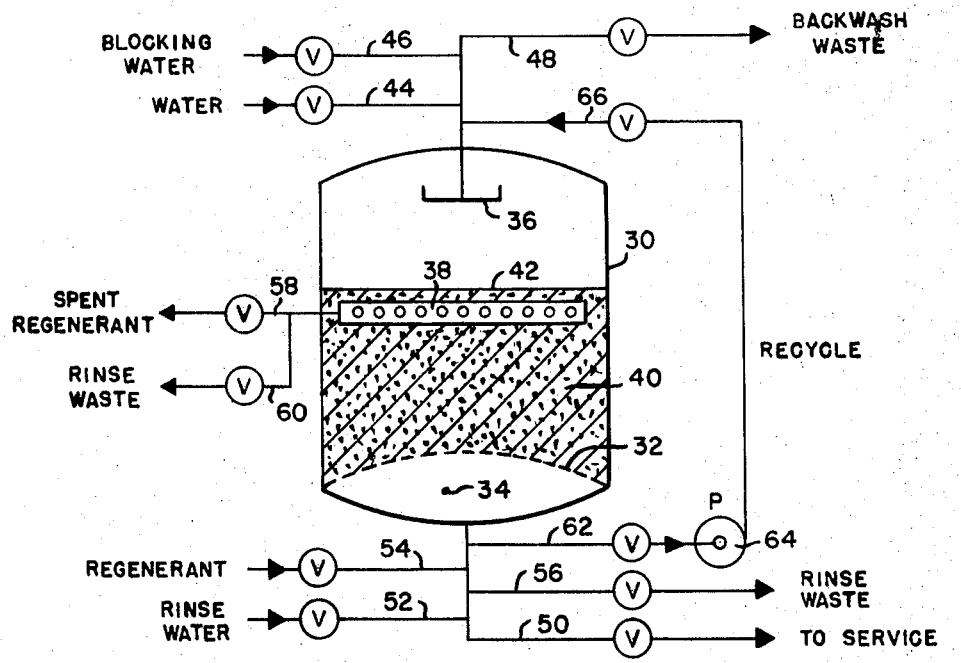
FIG. 2 is a flow diagram illustrating a system in which regeneration is effected by upward flow while there is downward flow in service.

FIG. 2 illustrates a different system which is also conventional except for the recycling of the regenerant for the transfer of ions, the service flow being downward, but the main regenerant bow being upward.

The vessel 30, as before, comprises a supporting bottom 32 perforated or otherwise formed to permit liquid passage and defining a lower chamber 34. A distributor 36 is located at the upper portion of the vessel. At an intermediate level in the vessel there is a receiving distributor 38 which may take the form of an array of perforated pipes having perforations of such size as to prevent the outflow of the particles of the resin 40. The amount of resin in such an exchanger is such that when the bed is in its normal condition for service flow its upper surface 42 is just above the distributor 38.

Valve connections are illustrated as follows:

44 is the inflow connection for water being treated. Blocking water, if desired, the flow of which is controlled, enters at 46. A backwash waste outlet is shown at 48. The effluent service connection is at 50. A lower rinse water connection is shown at 52. Regenerant, which in this case has an upward flow, enters at 54. Rinse waste outlet is located at 56.

Outlet connections from the distributor 38 are shown respectively at 58 for spent regenerant and at 60 for rinse water waste.

Recycling from the chamber 34 to the distributor 36 take place through connection 62, pump 64 and connection 66.

The operation of this system involves the following:

At the termination of the service run, inflow of water is terminated by closing the line 44 and the outflow to service is cutoff at connection 50.

Backwashing is then effected by providing an upward flow of water through connection 52 with exit of this water through the backwash waste outlet 48. This backwash flow losens the bed for thorough backwashing to remove dirt. The bed is then permitted to settle, all flow being interrupted.

The main regeneration now takes place by causing regenerant to enter the chamber 34 through connection 54 with upward flow through the bed, the regenerant passing out through the distributor 38 through the now open line 58 to the spent regenerant receiver if it is to be retained for further use or processing as indicated above. In the operation of this type of system, a controlled blocking flow of water may be provided through connection 46 and distributor 36 to move downwardly and escape through the distributor 38 along with the regenerant. The bed is compacted by virtue of the location of distributor 38 in the top of the bed.

Following this flow of regenerant which may take place under conventional conditions, preparation for recycling is made by the introduction of a controlled quantity of water from line 52 upwardly through the bed with outflow either through connection 58 or connection 60, depending upon whether the effluent is to be retained or run to waste. The action here involved is an previously described in connection with FIG. 1, namely to provide within the vessel a diluted composition suitable for recycling.

When suitable partial displacement has occurred the connections are closed, and then the connections 62 and 66 are opened and the pump 64 operated to provide recycling with downflow through the bed. The recycling effects the same results as those described in connection with the system of FIG. 1, the end result being the transfer of potential leakage ions from the bottom of the bed to the top thereof.

Following the end of the recycling operation, the recycling connections are closed and rinsing is effected by introducing water at 44 for downflow through the bed, the rinse being run to waste through connection 56. After the rinsing is completed, service run is resumed by closing the waste outlet 56 and opening the service connection 50.

If the recycling is to be accomplished with a different electrolyte than a diluted main regenerant composition, the main regenerant may be washed out of the system and replaced by the new recycle composition, the other steps remaining the same.

While in the type of system illustrated in FIG. 2 the service flow is downward, it may be upward, with arrangement of the vessel to maintain the bed in suitable condition. In such case, the recycling will, of course, be in an upward direction with the view, again, of transferring potential leakage ions from the effluent end of the bed to the influent end thereof.

Figure 3:
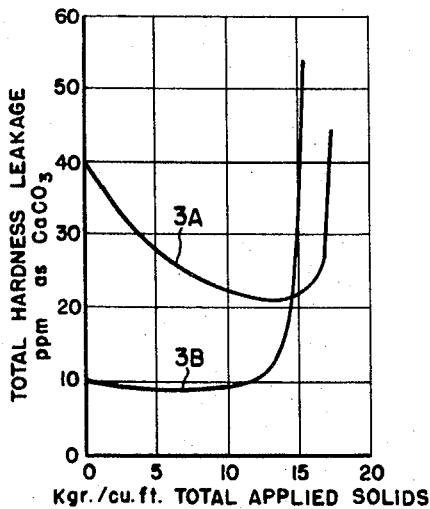
FIGS. 3 to 9, inclusive, are graphs illustrative of results obtained with different systems and conditions of operation.
Figure 4:
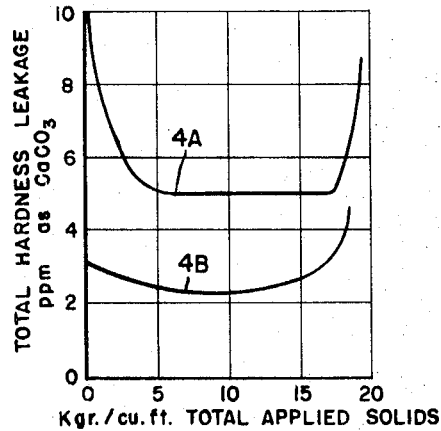
Figure 5:
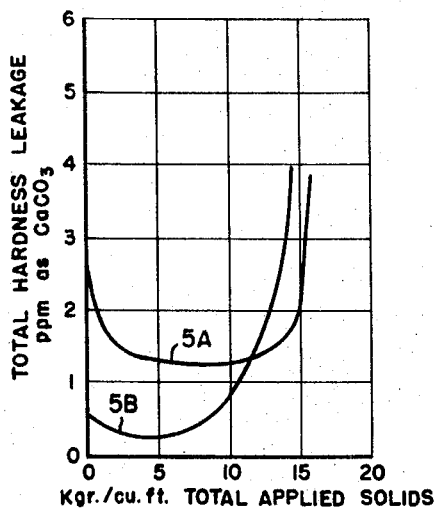

Examples of typical operations may now be given which are illustrative of the results secured under different conditions of operation. FIGS. 3, 4 and 5 relate to improvements in total hardness leakage. In all three cases there was service downflow and downflow regeneration with sodium chloride, the resin used being Nalcite HCR.

In the cases illustrated in FIGS. 3 and 4 the same water was treated having an analysis of: calcium—324 p.p.m., magnesium—175 p.p.m., and sodium—20 p.p.m., all given an equivalent p.p.m. of $CaCO_3$. (Unless otherwise specified where parts per million are indicated in water treatment for cation removal the reference is equivalent to parts per million of calcium carbonate in the conventional fashion used in this art.)

In FIG. 3 the upper curve 3A illustrates the leakage which occurred in a run not involving the mass action recycling in accordance with the invention. Regeneration in this case was with 3.6 pounds of sodium chloride regenerant per cubic foot of the bed, the sodium chloride being in the form of a saturated brine. The bed had a depth of 34 inches. Rinsing was accomplished in usual fashion before the onstream flow was started. The total hardness leakage, in terms of p.p.m. as $CaCO_3$ is plotted against kilograins per cubic foot of bed of total dissolved solids applied in water. As will be noted, the total hardness leakage began at the value of 40 p.p.m., decreasing to approximately 20 p.p.m. when the total kilograins per cubic foot of dissolved solids reaches 10–15, and thereafter the leakage increased rapidly indicating ineffectiveness of the bed. This operation would be typical of operation in accordance with prior art practices.

Curve 3B represents a typical operation in accordance with the invention. In this case regeneration was carried out as described for the operation just mentioned. However, following the regeneration dilution of the brine was effected to produce for recycling a brine containing 4,000 p.p.m. of sodium chloride (as NaCl) and this dilute regenerant was recycled downwardly through the bed for 30 minutes at a rate of flow of 10 gallons per minute per square foot of bed cross-section. At the end of this recycling rinsing was effected and then the operation was put onstream.

It will be noted that in this case the leakage of total hardness was very considerably reduced to 10 p.p.m. and remained approximately at this value until the total kilograins per cubic foot of dissolved solids passed into the bed reached a value of about 12, whereupon there occurred the rapid rise of total hardness leakage indicative of ineffectiveness of the bed.

While in terms of total dissolved solids introduced the bed in the second case appears to be earlier exhausted, the result is not corrected for leakage, and the results are efficiently equivalent in extent of removal of hardness.

The results of alternative operations, again treating the same water as in the cases illustrated in FIG. 3, and on the same bed, are illustrated in FIG. 4, in which case the same bed was used, but after exhaustion regeneration was effected by the use of a larger quantity of sodium chloride, namely 6.5 pounds per cubic foot of the bed in the form of saturated brine. Curve 4A represents operation without recycling, i.e., after regeneration the bed was rinsed and then put onstream. In this case the use of the increased amount of regenerant, effecting more complete regeneration, is reflected in the fact that the leakage started at a lower value than in the case illustrated in curve 3A, namely at 10 p.p.m., with a drop of leakage to about 5 p.p.m. at which point it remained substantially constant until the total dissolved solids treated involved about 17 kilograins per cubic foot whereupon the leakage rapidly rose.

When the same regeneration was followed by dilution of brine to 7,500 p.p.m. of sodium chloride and recycling was effected downwardly through the bed for 30 minutes at a flow rate of 10 gallons per minute per square foot, as before, marked improvement appeared at illustrated in the curve 4B, the initial leakage being at approximately 3 p.p.m. with a gradual drop to a little over 2 p.p.m. followed by a gradual rise reaching a value of 4 p.p.m. after the total dissolved solids treated reached about 18 kilograins per cubic foot, after which the rise of leakage was such as to indicate ineffectiveness of the bed.

Reference may next be made to FIG. 5 which illustrates treatment of water containing less hardness in a shallower bed having a depth of 32 inches. In this case the water treated contained 86 p.p.m. of calcium, 31 p.p.m. of magnesium and 20 p.p.m. of sodium, all as equivalent $CaCO_3$. Referring to curve 5A illustrating operation without the recycling, regeneration was effected with 3.6 pounds per cubic foot of sodium chloride in the form of a saturated brine followed by rinsing. The onstream leakage in this case started at about 4 p.p.m. of total hardness, the leakage dropping to about 1.2 p.p.m. when the total dissolved solids treated reached approximately 8 kilograins per cubic foot. There was then a gradual rise of leakage to a value of about 2 p.p.m. at 15 kilograins per cubic foot of total dissolved solids, at which time the bed became ineffective.

In contrast with the last, curve 5B represents the operation following a similar regeneration and then dilution of the brine to 2,000 p.p.m. of sodium chloride (as NaCl) and recycling for 120 minutes at a rate of 10 gallons per minute per square foot of bed cross-section. After rinsing the onstream operation involved an initial leakage of about 0.5 p.p.m. of total hardness with a drop to about 0.3 p.p.m. followed by a rise of total hardness leakage to about 1 p.p.m. when the total dissolved solids treated reached about 12 kilograins per cubic foot, this being followed by a rapid rise of leakage indicative of ineffectiveness of the bed.

The foregoing operations are typical in comparison of treatments with and without the recycling in accordance with the invention. For the same expenditure of regenerant, the recycling produces a marked improvement in the substantial lowering of leakage during the effective part of service flow. While the point of reaching ineffectiveness of the bed, in terms of total dissolved solids treated, may be somewhat less when recycling is used as compared with the situation when recycling is not used, this is essentially immaterial in view of the great advantage secured in reducing leakage during the major part of the service cycle there being improved retention of the ions to be removed. As indicated by the curves, initial leakage may be reduced by ratios of better than 4 to 1 with very substantial reduction of average leakages.

Obviously substantially more regenerant would be required initially to obtain these lower leakages without the mass action recycling.

Figure 6:
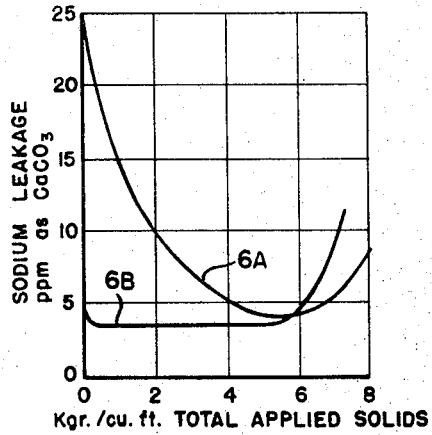

FIG. 6 illustrates the advantage of the invention in reducing sodium leakage in a hydrogen cycle operating using a 32 inch bed of HCR resin. The water treated, both with and without utilization of the invention, had the following composition: calcium—202 p.p.m., magnesium—76 p.p.m., and sodium—29 p.p.m., all as equivalent calcium carbonate. The anions were $HCO_3$, Cl and $SO_4$. Using a conventional operation, regeneration was effected by the use of a regenerant of aqueous sulphuric acid containing 3.0 pounds of $H_2SO_4$ per cubic foot of bed. After rinsing the onstream characteristics were as illustrated by the curve 6A, the initial sodium leakage (in p.p.m. as $CaCO_3$) started at 25 p.p.m. dropping gradually to about 4 p.p.m. when approximately 5 kilograins per cubic foot of total solids were applied, the leakage thereafter rising until the bed became ineffective at about 8 kilograins per cubic foot of applied total solids.

In utilizing the invention, the same regeneration with three pounds per cubic foot of sulphuric acid was effected, and then recycling was accomplished using the regenerant diluted to 5,000 p.p.m. of sulphuric acid, the recycling being carried out for 60 minutes at a flow rate of 10 gallons per minute per square foot of cross section of the bed. Following rinsing the bed was put onstream with the results shown in curve 6B.

In this case the leakage started at about 4 p.p.m. dropping quickly to about 3 p.p.m. and then remaining substantially constant until the applied total dissolved solids reached about 6 kilograins per cubic foot, with rise thereafter indicating ineffectiveness of the bed. It will be evident that in accordance with the invention there was a very marked and immediate improvement in the sodium leakage in contrast with the slow reduction of sodium leakage when recycling in accordance with the invention was not used.

Figure 7:
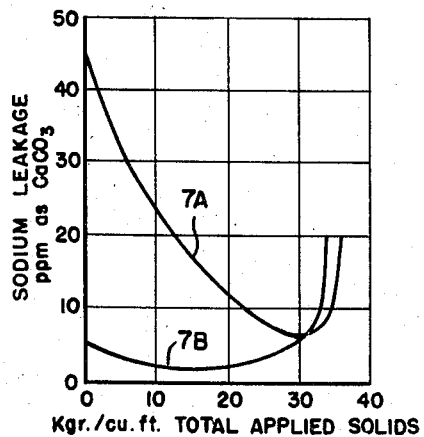

FIG. 7 is illustrative of the improvement of sodium leakage under conditions differing from those illustrated in FIG. 6. In the cases involved in FIG. 7 there was used a 32 inch depth bed of HCR–W resin with operation on the hydrogen cycle. The composition of the water treated was: calcium—1 p.p.m., magnesium—1 p.p.m. and sodium—648 p.p.m., all as equivalent $CaCO_3$. The anions were $HCO_3$, Cl and $SO_4$. When the invention was not used regeneration was effected by dilute sulphuric acid having an $H_2SO_4$ content of 15 pounds per cubic foot of bed. After rinsing the onstream operation gave results as indicated in FIG. 7A. Initial sodium leakage had a high value of approximately 45 p.p.m. as $CaCO_3$, dropping gradually to a minimum of about 5 p.pm. when the total solids applied amounted to approximately 30 kilograms per cubic foot of bed, with quick exhaustion after that point.

Utilizing the invention, after regeneration with sulphuric acid as before, dilution of the regenerant was accomplished to 6,500 p.p.m. of sulphuric acid and recycling was effected for 30 minutes at a flow rate of 10 gallons per minute per square foot of cross section of the bed. After rinsing, onstream operation took place as indicated in curve 7B. Initial sodium leakage started at the low value of about 5 p.p.m. with gradual reduction to about 2 p.p.m. and then a slow rise again reaching 5 p.p.m. when the total applied solids attained a value of about 30 kilograins per cubic foot of the bed. At this point there was a rapid rise in leakage indicating the limit of effectiveness. In view of the high sodium content of the water being treated the reduction of leakage is noteworthy.

Figure 8:
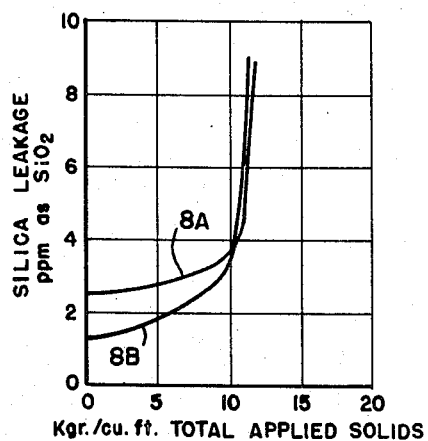

Referring to FIG. 8, this illustrates the matter of silica removal from soft water containing substantially only sodium cations. Silica removal was effected in this case operating a 32 inch depth bed of anion resin IRA400 on the hydroxyl cycle. The anion analysis of the water being treated was the following: $HCO_3$—83 p.p.m., Cl—67 p.p.m., $SO_4$—54 p.p.m., $SiO_2$—26 p.p.m. and $CO_2$—10 p.p.m., all as equivalent $CaCO_3$.

Regeneration was effected by using a caustic soda solution containing a total of 3 pounds of NaOH per cubic foot of bed, followed by rinsing, the onstream operation giving the results shown in curve 8A. Silica leakage, given as p.p.m. of $SiO_2$ started at a value of about 2.5 rising gradually to 4 p.p.m. at the point at which the treatment became ineffective at approximately 10 kilograins per cubic foot of applied total solids.

In contrast with this was operation in accordance with the invention in which after the same regeneration with 3 pounds per cubic foot of NaOH the caustic solution was diluted to 9,600 p.p.m. as NaOH and recycling was effected for 25 minutes at a flow rate of the diluted caustic solution of 10 gallons per minute per square foot of bed cross section. After rinsing the onstream operation was as illustrated in curve 8B. Initial leakage of silica started at a little over 1 p.p.m. with gradual rise to reach the point of ineffectiveness at the value of 10 kilograins per cubic foot of bed of applied total dissolved solids. While the ratio of leakage not using the invention to that involved in using the invention is not numerically as impressive as in the previous cases involving cation leakage considerations, from the practical aspect of silica removal the use of the invention constitutes a quite marked improvement.

Figure 9:
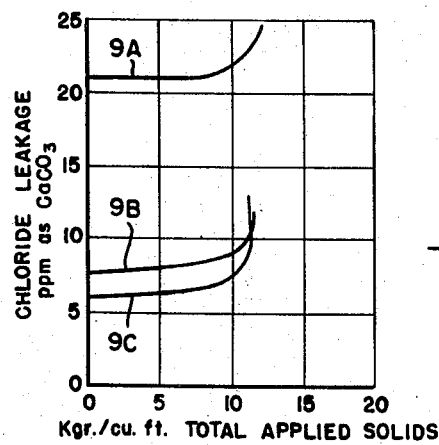

In all of the foregoing examples, ordinary room temperatures were involved in the recycling operation. But notable improvements may be effected by recycling at elevated temperatures as illustrated with reference to FIG. 9 involving improvements in chloride leakage in the treatment of all-sodium water utilizing an anion resin IRA400 in a 32 inch depth bed operating on a hydroxyl cycle. In this case the water treated contained only sodium cations with an anion composition as follows: $HCO_3$—83 p.p.m., Cl—67 p.p.m., $SO_4$—55 p.p.m., $SiO_2$—26 p.p.m. and $CO_2$—10 p.p.m., all as $CaCO_3$. Conventional operation was carried out by regeneration of the exhausted bed with 3 pounds of NaOH in solution per cubic foot of the bed, followed by rinsing and then onstream operation giving the results indicated in curve 9A. Initial chloride leakage (as p.p.m. as $CaCO_3$) began at about 21 remaining rather constant until rapid rise indicating ineffectiveness of the operation occurred at about 10 kilograins per cubic foot of total applied solids.

In contrast with this, in accordance with the invention, the same regeneration was effected followed by dilution of the caustic regenerant to 9,500 p.p.m. as NaOH, the diluted regenerant being recycled for 25 minutes at a flow rate of 10 gallons per square foot of cross section of the bed utilizing the regenerant at an ambient temperature of 70° F. After rinsing the onstream operation was as illustrated by curve 9B, initial chloride leakage being at the rate of approximately 7.5 p.p.m. with gradual rise to essentially the same exhaustion point as in the case of curve 9A.

A repetition of the same procedure in accordance with the invention but using a temperature during recycling of 105° F. gave the results indicated in curve 9C, with substantial reduction of initial and continuous leakage, with initial leakage at about 6 p.p.m. The improvement in the results of the recycling due to elevated temperature above the normal operating temperature is substantial and similarly occurs in the case of other ion removal operations.

From the foregoing examples it will be evident that the invention is of very broad applicability. The mass action recycling may be used irrespective of whether cation or anion leakage is to be reduced. The invention may also be used whether the leakage to be minimized is for the purpose of lowering contamination of the effluent or whether the operation is to secure the recovery of valuable ions such as metal cations or anions such as chromate anions.

As an example of a special use of the invention there may be cited the reduction of sodium leakage from ammoniated cation resin in the process of condensate-polishing using mixed beds. In such a process a cation resin operating on the ammonia cycle is mixed with anion resin on the hydroxyl or borate cycle, or other anion forms may be used. Recycling of the mixed bed in the hydroxyl cycle case may involve the recycling of ammonium hydroxide in concentrations of 500 to 5,000 p.p.m. as $NH_3$. If the borate cycle is used ammonium borate would be recycled.

Another example is the prevention of leakage of monovalent anions, either simple anions or metallic ligands from strongly basic anion exchangers operating on the hydroxyl cycle or on some other monovalent resin form. The corresponding electrolyte may be recycled in concentrations typically ranging from 500 to 15,000 p.p.m.

Whether the ions are monovalent, divalent or polyvalent, suitable concentrations of the recycled electrolyte may be adopted to secure the mass action effect to concentrate the potentially leaking ions at the inlet end of the bed, from the standpoint of onstream operation.

It will be obvious that the mass action recycling procedure improves leakage from fixed ion exchange beds regardless of the source of contamination. In addition, it removes ions from unregenertated portions of resin or contaminants that may be due to the inefficiency of the ion exchange equipment itself. For instance it reduces the effect of regenerant channeling.

It will accordingly be understood that the invention is not to be regarded as limited except as required by the appended claims.

What is claimed is:

1. The method of operating an ion exchanger which has a fixed bed during at least onstream operation to reduce leakage therefrom of ions desirably removed by the ion exchanger during onstream operation, which method includes recycling through the fixed regenerated bed in the direction of onstream flow, and then, directly and without substantial change of composition, from its exit to its inlet, a regenerant composition adapted by mass action ion exchange to remove from the exit end of the bed said ions liable to leakage and locate them by ion exchange with said exchange material selectively at the inlet end of the bed prior to onstream operation.

2. The method of claim 1 in which the recycled composition is provided by dilution of the regenerant used for regeneration of the exchange material of the bed.

3. The method of claim 1 in which the recycled composition is at a temperature exceeding the normal operating temperature of onstream operation.

4. The method of claim 2 in which the recycled composition is at a temperature exceeding the normal operating temperature of onstream operation.

References Cited

UNITED STATES PATENTS

| 2,267,841 | 12/1941 | Riley | 210—34 |
| 2,773,029 | 12/1956 | Sebald | 210—32 X |
| 3,156,644 | 11/1964 | Kunin | 210—32 |

SAMIH N. ZAHARNA, Primary Examiner